(12) United States Patent
Melen

(10) Patent No.: US 6,868,333 B2
(45) Date of Patent: Mar. 15, 2005

(54) GROUP INTERACTION SYSTEM FOR INTERACTION WITH OTHER VEHICLES OF A GROUP

(75) Inventor: Roger D. Melen, Los Altos Hills, CA (US)

(73) Assignee: Toyota InfoTechnology Center Co., Ltd., Tokyo (JP)

( * ) Notice: Subject to any disclaimer, the term of this patent is extended or adjusted under 35 U.S.C. 154(b) by 0 days.

(21) Appl. No.: 10/346,503

(22) Filed: Jan. 15, 2003

(65) Prior Publication Data

US 2004/0148090 A1 Jul. 29, 2004

(51) Int. Cl.[7] .............................................. G01C 21/00
(52) U.S. Cl. ....................................................... 701/200
(58) Field of Search ................................. 701/200, 213, 701/214; 340/988

(56) References Cited

U.S. PATENT DOCUMENTS 6,490,521 B2 * 12/2002 Wiener ........................ 701/211
6,549,768 B1 * 4/2003 Fraccaroli ................. 455/456.3

FOREIGN PATENT DOCUMENTS

| JP | 2000-357296 | 12/2000 |
| JP | 2002-277256 | 9/2002 |

OTHER PUBLICATIONS

"Trimble GPS Technology Enables Seiko Epson Communication Device and Wireless Data Service," Trimble News Release [online], Nov. 8, 1999 [retrieved on Apr. 8, 2003]. Retrieved from the Internet: <URL: http://www.trimble.com/news/110899a.htm>.

Garmin® rino 110 2–way radio & personal navigator®— Owner's Manual and Reference Guide; Sep. 2002.

International Search Report for International Application No. PCT/JP2004/000250, dated Mar. 16, 2004.

* cited by examiner

Primary Examiner—Yonel Beaulieu
(74) Attorney, Agent, or Firm—Fenwick & West LLP

(57) ABSTRACT

The group interaction system comprises a plurality of vehicle navigation systems that are capable of communicating with one another, displaying the location of other vehicle navigation systems in a group, and receiving selection of certain vehicle navigation systems in the group and selection of an application for interaction among the selected vehicle navigation systems. A group of vehicle navigation systems to interact with is established. One or more of other vehicle navigation systems to interact with the vehicle navigation system. An application is also selected on the vehicle navigation system for interaction with the selected other vehicle navigation systems. In response, the vehicle navigation system runs the selected application with respect to the selected other navigation systems.

15 Claims, 12 Drawing Sheets

GROUP INTERACTION SYSTEM FOR INTERACTION WITH OTHER VEHICLES OF A GROUP

TECHNICAL FIELD

The present invention relates generally to group interaction systems enabling interaction with people in other vehicles, and more specifically, to a group interaction system in a networked vehicle environment in which a user may interact with people in other vehicles of an enabled group by using their networked vehicle navigation systems.

BACKGROUND OF THE INVENTION

Recently, vehicles have been equipped with navigation systems using global positioning systems (GPS). Conventional navigation systems using GPS pinpoint the current location of a vehicle by triangulation of GPS signals received from three satellites. Such conventional navigation systems typically read digital maps from a CD-ROM, DVD-ROM, or hard disk storing such digital maps, an are capable of indicating the current location of the vehicle on the digital map and guiding the user to a particular destination. However, conventional navigation systems are incapable of tracking the current location of vehicles other than the vehicle in which the navigation system resides.

Vehicles are also equipped with wireless communication systems such as cellular telephones or satellite telephones. Vehicle users may communicate with people in other vehicles by using such wireless communication systems. However, conventional wireless communication systems are incapable of providing a convenient way of communicating or interacting with a specific group of people or selected members of the group. In order to communicate with selected members of the group, the user of conventional wireless communication systems needs to places a call manually to the selected members of the group, while the user is driving on the road. Such primitive way of communicating or interacting with other members of the group is inconvenient and interruptive.

Conventional vehicle navigation systems cannot track the current location of other vehicles besides the vehicle in which the navigation system resides either, since they are not capable of communicating with other navigation systems residing in other vehicles. For example, a group of people may drive in separate vehicles to a common destination. In such situation, members of the group would like to track the current location of other members in each of the vehicles in the group so that they can stay together and do not get separated too far apart. Members of the group may also want to be able to communicate with other members in the group while they are driving to the destination in a convenient manner. However, conventional navigation systems fail to provide a way of tracking the location of other vehicles and interacting with them.

Some conventional two-way radio systems ("walkie-talkie") are equipped with GPS functionality and have the ability to send its position to the other walkie-talkie using radio signals, so that one user of the walkie-talkie may determine the position of another walkie-talkie. Here, the GPS information of one user of the walkie-talkie is transmitted to the other walkie-talkie by radio frequency communication. However, these two-way radio systems fail to provide maintain a group of members, and location of the members may not be tracked in real-time because the GPS information is only manually transmitted and not updated continuously. Furthermore, anyone with such walkie-talkie may intercept the position information, so these walkie-talkies fail to provide privacy within a group.

Therefore, there is a need for a group interaction system in which members of the group may track each other's locations, and communicate or interact with each other in real time and in a convenient and non-interruptive manner. There is also a need for a method of establishing the group of members to be used with the group interaction system in a convenient and efficient manner.

SUMMARY OF INVENTION

The group interaction system of the present invention comprises a plurality of vehicle navigation systems that are capable of communicating with one another in a group, tracking and displaying the location of each other and sharing an application for interaction among selected vehicle navigation systems. The user of the vehicle navigation system defines the group of vehicle navigation systems with which to interact using identification information corresponding to the vehicle navigation systems. The user selects one or more of the other vehicle navigation systems from the group and a software application for interaction with the selected vehicle navigation systems. In response, the vehicle navigation system of the present invention runs the selected application with respect to the selected vehicle navigation systems. The application may include a cellular telephone application.

In one embodiment of the present invention, the vehicle navigation system comprises a global positioning system (GPS) module receiving a GPS signal for determining the location of the vehicle navigation system, a wireless communications module for communicating with other vehicle navigation systems of a group and receiving location information of the other vehicle navigation systems in the group, a display device for displaying the location of the vehicle navigations systems in the group on a map and a list of one or more applications, and an input device such as a touch sensitive screen coupled to the display device for receiving input commands corresponding to selection of one or more of the other vehicle navigation systems in the group shown one on the map and a selection of an application. A processor coupled to the touch sensitive screen runs the selected application with respect to the other vehicle navigation systems in the selected second vehicles.

The group interaction system also includes a vehicle network server facilitating the interaction among the vehicle navigation systems of a group. The vehicle network server comprises a wireless communications module for communicating with the vehicle navigation systems of the group. The wireless communications module receives from a vehicle navigation system a selection of one or more vehicle navigation systems with which to interact and a selection of an application for interaction among the selected vehicle navigation systems in the group. The vehicle network server also comprises a processor coupled to the wireless communications module for running the selected application with respect to the selected vehicle navigation systems.

The vehicle navigation system of the present invention enables its user to establish a group with which to interact while simultaneously tracking the location of the vehicle navigation systems in the group. The vehicle navigation system also provides a simple and convenient way of selecting certain members (or vehicle navigation systems) in the group for interaction. An application for interaction with the selected members may also be conveniently selected.

The vehicle navigation system of the present invention is capable of running the selected application with respect to the selected members (or vehicle navigation systems).

BRIEF DESCRIPTION OF THE DRAWINGS

The teachings of the present invention can be readily understood by considering the following detailed description in conjunction with the accompanying drawings.

DETAILED DESCRIPTION OF EMBODIMENTS

Figure 1A:
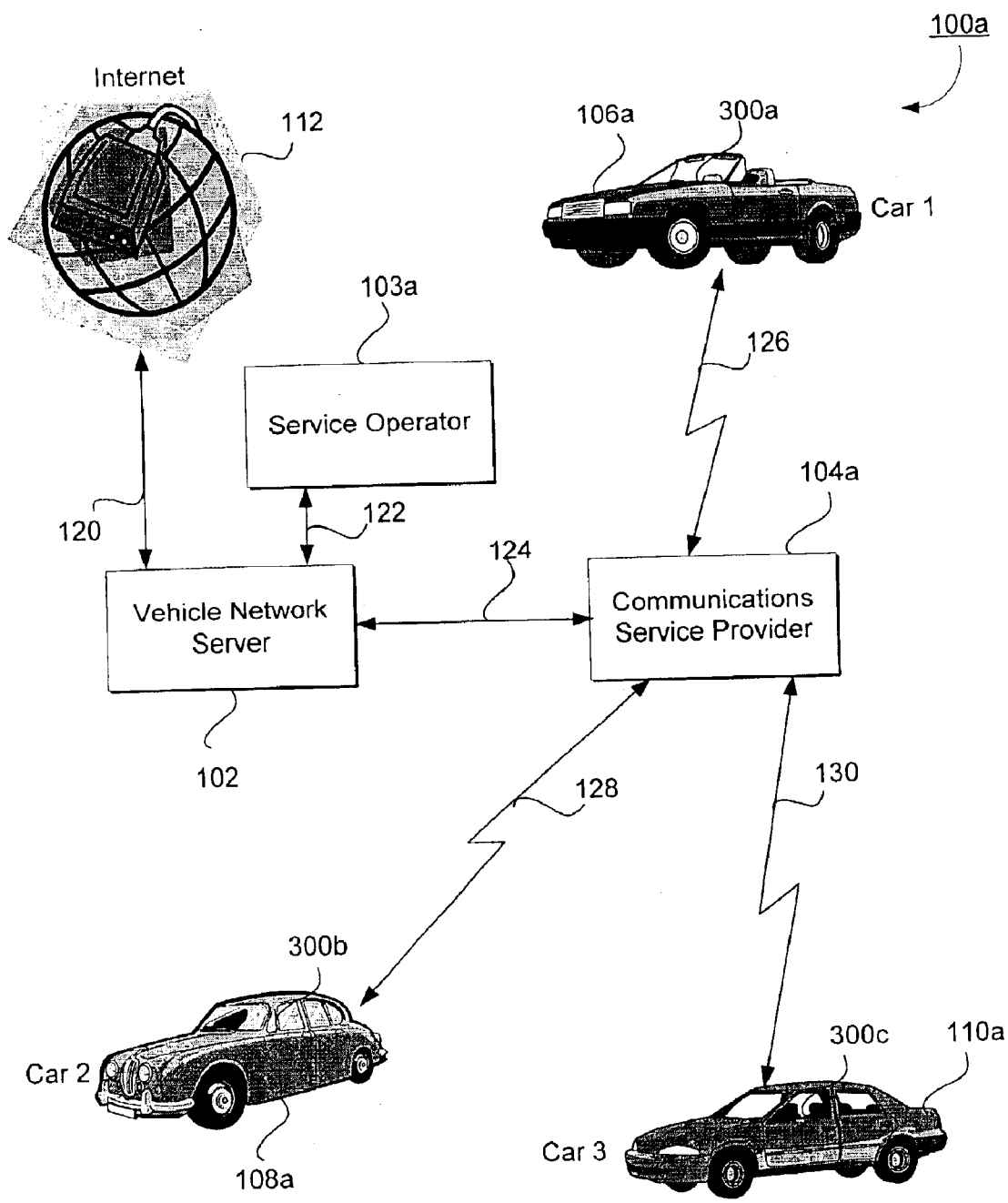
FIG. 1A is a diagram illustrating a group interaction system according to a first embodiment of the present invention.

The embodiments of the present invention will be described below with reference to the accompanying drawings. Like reference numerals are used for like elements in the accompanying drawings.

FIG. 1A is a diagram illustrating a networked group interaction system 100a according to a first embodiment of the present invention. The networked group interaction system 100a includes a plurality of vehicles 106a, 108a, 110a, a communications service provider 104, a vehicle network server 102, and a service operator 103a. The vehicle network server 102 is also shown connected to the Internet 112. The vehicles 106a, 108a, 110a include vehicle navigation systems 300a, 300b, 300c, respectively, for use in the networked group interaction system 100a of the present invention. Although the group interaction system 100a is shown with three vehicles 106a, 108a, 110a, it should be clear to one skilled in the art that any plurality of vehicles and corresponding vehicle navigation systems may be used consistent with the present invention.

The navigation systems 300a, 300b, 300c are capable of performing the functions of conventional navigation systems and are also configured to establish a group of members associated with other navigation systems 300a, 300b, 300c and communicate/interact with other navigation systems 300a, 300b, 300c in the group in accordance with the embodiment. That is, the navigation systems 300a, 300b, 300c are capable of displaying the corresponding vehicle's location by using conventional Global Position Systems (GPS) (not shown) installed therein. In addition, the navigation systems 300a, 300b, 300c in the vehicles 106a, 108a, 110a, respectively, are capable of wireless communication 126, 128, 130, preferably cellular communication, through the communications service provider 104. The communication service provider 104 communicates with the vehicle network server 102a via a wired communication (e.g., a telephone line) 124, although wireless communication may also be used. The communications service provider 104 may be any conventional cellular telephone service provider.

Referring to FIG. 1A, the group interaction system 100a enables communication and interaction with members of an enabled group according to the methods described in FIGS. 5, 6A, 6B, 7A, and 7B using the navigation systems 300a, 300b, 300c. The vehicle navigation systems 300a, 300b, 300c in the vehicles 106a, 108a, 110a, respectively, are capable of wireless communication or interaction with one another. In the group interaction system 100a of FIG. 1, wireless communication or interaction among selected members of the enabled group (selected users of the vehicle navigation systems 300a, 300b, 300c) is accomplished via the communication service provider 104a and the vehicle network server 102. The group interaction system 100a is a star topology with the vehicle network server 102 being at the center of the star, such that all communication or interaction among the selected members is accomplished through the vehicle network server 102. For example, the navigation system 300a in vehicle 106a may transmit control signals to the vehicle network server 102a via the communications service provider 104a in order to establish wireless communication or other types of interaction with the navigation system 300b in vehicle 108a. In response, the vehicle network server 102a establishes wireless communication or interaction between the navigation system 300a in vehicle 106a and the navigation system 300b in the vehicle 108a of the enabled group. As stated above, the wireless communication between the navigation systems 300a, 300b, 300c is preferably a cellular telephone communication, although it should be clear to one skilled in the art that other types of wireless communication such as satellite communication, short-range radio communication, or IEEE 802.11(b) standard communication may be used in accordance with the present invention.

The navigation systems 300a, 300b, 300c may also transmit or receive GPS information of the corresponding vehicles 106a, 108a, 110a, to other navigations systems 300a, 300b, 300c within the group using wireless communication through the vehicle network server 102. For example, navigation system 300a may receive the GPS information of vehicles 108a, 110a, from the navigation systems 300b, 300c, respectively, through the vehicle network server 102 and the communications service provider 104a. The GPS information of the other vehicles 108a, 110a may be displayed on a display of the navigation system 300*a* along with the GPS information of its own vehicle 106*a*.

The vehicle navigation systems 106*a*, 108*a*, 110*a*, are capable of transmitting and receiving GPS information and control signals selecting groups and applications along with the data (e.g., voice data and control signals for cellular telephone calls) required for running applications among selected members simultaneously to and from the vehicle network server 102. The data required for running applications are transmitted and received via conventional cellular telephone communication (such as GSM) while the GPS information and control signals for selecting groups and applications are transmitted and received using text messaging (short messaging service) in cellular telephone communication.

An optional service operator 103*a* coupled to the vehicle network server 102 may also provide various services to the members in the group, such as providing live operator service, voice mail service, and the like. The service operator 103*a* may also be capable of establishing wireless communication among the navigation systems 300*a*, 300*b*, 300*c* manually, in case the vehicle network server 102 becomes incapable of automatically establishing such wireless communication. The communication between the server operator 103*a* and the vehicle network server 102 is preferably carried out by wired communication 122.

Figure 6A:
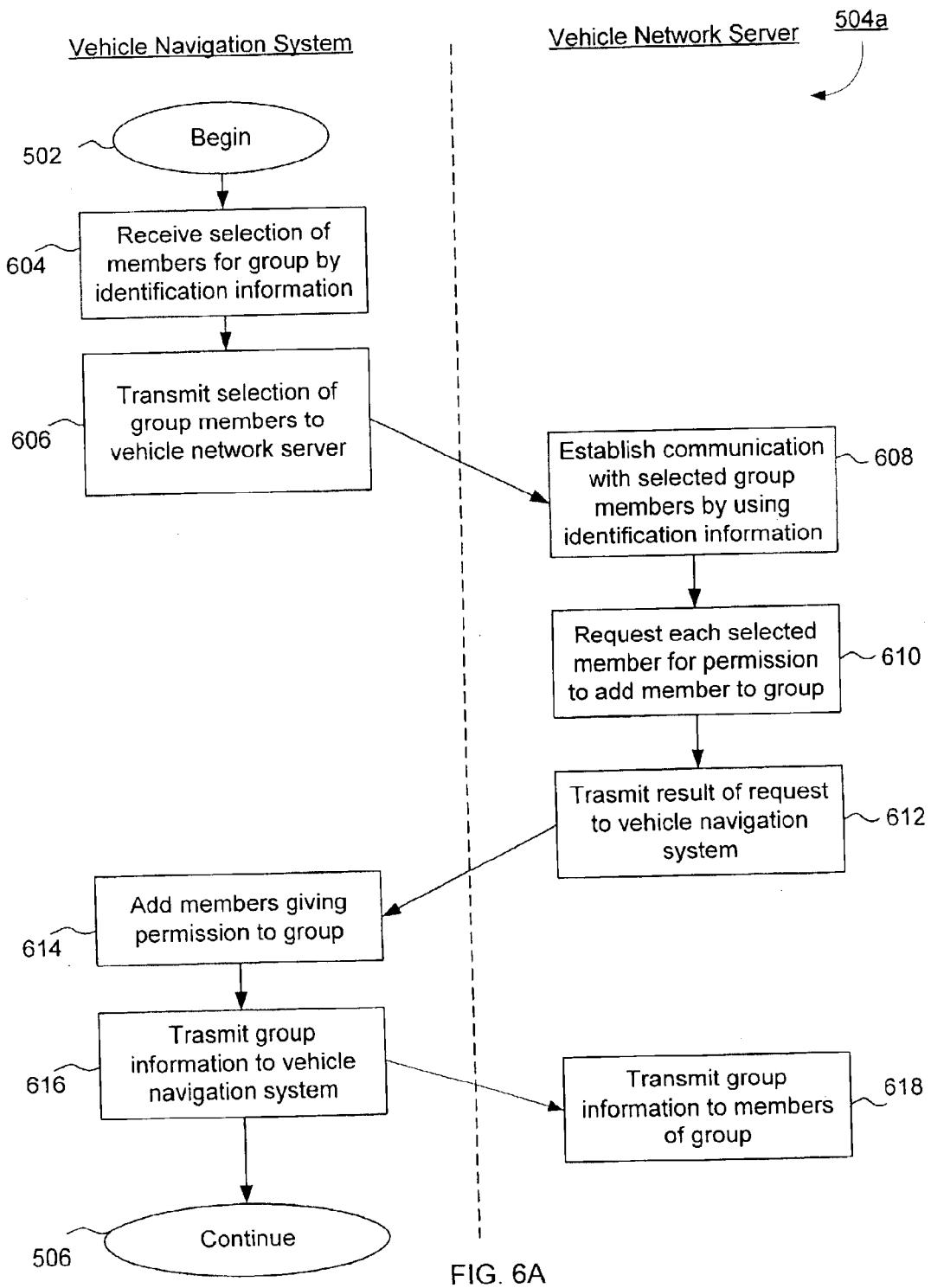
FIG. 6A is a flowchart illustrating a method of establishing a group of members according to a first embodiment of the present invention.
Figure 6B:
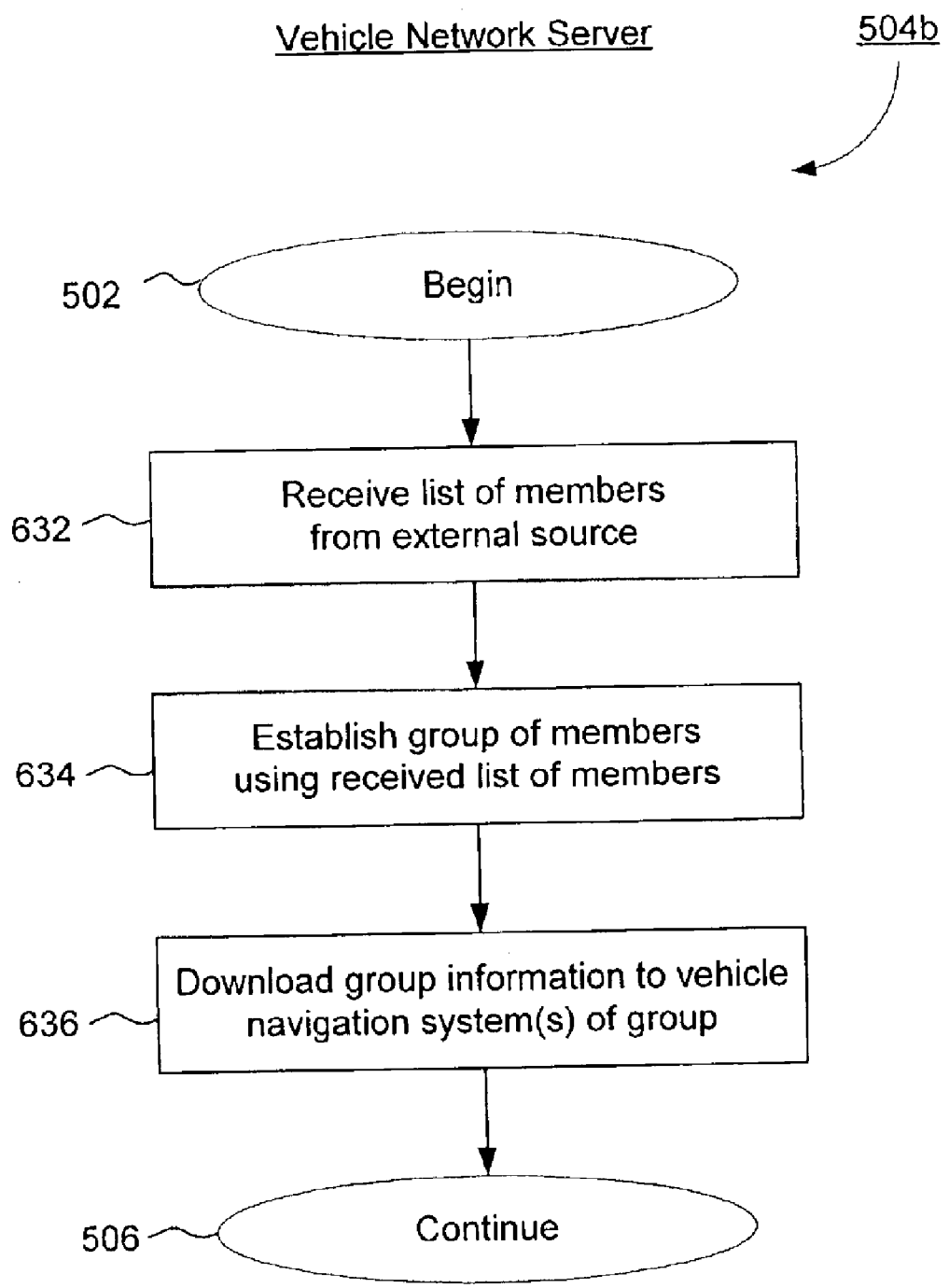
FIG. 6B is a flowchart illustrating a method of establishing a group of members according to a second embodiment of the present invention.

The group interaction system 100*a* establishes the group of members for wireless communication or other types of interaction using various methods such as those described in FIGS. 6A and 6B. For example, the group may be established in the navigation systems 300*a*, 300*b*, 300*c* by manual input by its users. The group may also be input and stored on a web server (not shown) on the Internet 112 and downloaded from the web site to the vehicle network server 102 via wired data communication 120. The vehicle network server 102 in turn provides the group information to the respective navigation systems 300*a*, 300*b*, 300*c* via the communications service provider 104*a*. It should be clear to one skilled in the art that various methods of establishing an interactive group for the vehicle navigation systems 300*a*, 300*b*, 300*c* may be used consistent with the present invention.

The group information for the group interaction system 100*a* contains various information regarding the members in the group, such as the identification of each vehicle navigation system 300*a*, 300*b*, 300*c* and the vehicle identification numbers of the corresponding vehicles 106, 108, 110 by their user names or any other type of identification, and a cellular telephone number corresponding to each of the navigation systems 300*a*, 300*b*, 300*c*. The group information may also contain other information, such as the applications available on the respective navigation systems 300*a*, 300*b*, 300*c* for interaction with other members of the group.

The group interaction system 100 according to the first embodiment of the present invention may be used to establish a group of members for interaction, track the location of the members in real-time, and to communicate or interact with selected members of the group by wireless communication. For example, the user of the navigation system 300*a* in vehicle 106 may establish a group including the navigation systems 300*a*, 300*b*, 300*c* in vehicles 106*a*, 108*a*, 110*a*, respectively. Each navigation system 300*a*, 300*b*, 300*c* keeps track of the location of all the vehicles in the group in real time using its own GPS information and the GPS information received from other vehicles 106*a*, 108*a*, 110*a* via the vehicle network server 102. Each member in the group may select some of the members in the group using the navigation systems 300*a*, 300*b*, 300*c* and communicate or interact with the selected members via wireless communication. The manner in which members in the group are selected using the navigation systems and wireless communication or interaction among the selected members is accomplished will be described in detail below with reference to FIGS. 2–5, 6A–6B, and 7A–7B.

Figure 1B:
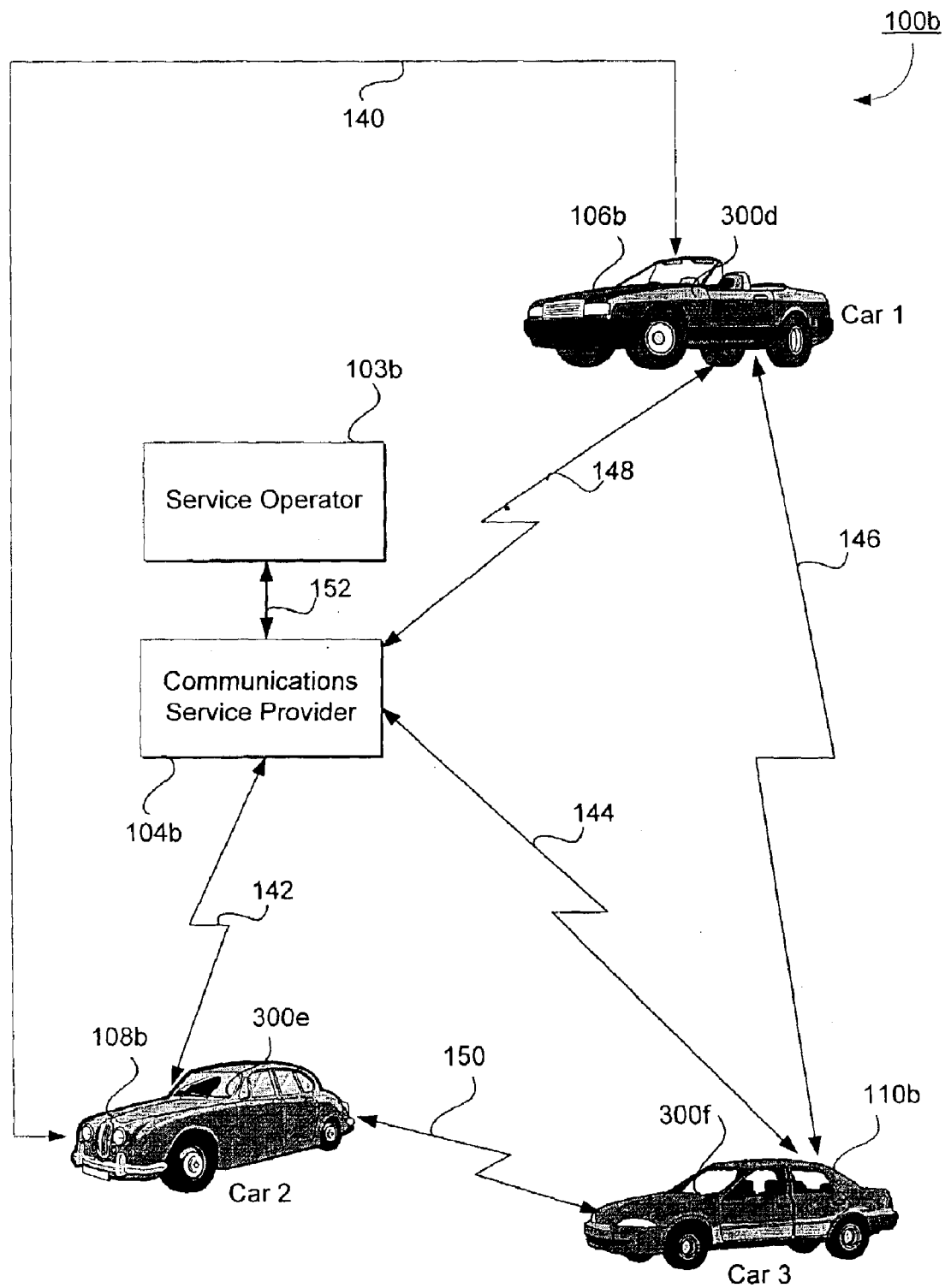
FIG. 1B is a diagram illustrating a group interaction system according to a second embodiment of the present invention.

FIG. 1B is a diagram illustrating a networked group interaction system 100*b* according to a second embodiment of the present invention. In contrast to the group interaction system 100*a* shown in FIG. 1A that uses a vehicle network server 102, the group interaction system 100*b* in FIG. 1B is modified to be a peer-to-peer system enabling wireless communication without the use of a vehicle network server 102.

The networked group interaction system 100*b* includes a plurality of vehicles 106*b*, 108*b*, 110*b*, a communications service provider 104*b*, and an optional service operator 103*b*. The vehicles 106*b*, 108*b*, 110*b* include vehicle navigation systems 300*d*, 300*e*, 300*f*, respectively, for use in the networked group interaction system 100*b* of the present invention. Although the group interaction system 100*b* is shown with three vehicles 106*b*, 108*b*, 110*b* and three corresponding vehicle navigation systems 300*d*, 300*e*, 300*f*, it should be clear to one skilled in the art that any number of vehicles and corresponding vehicle navigation systems may be used consistent with the present invention.

The navigation systems 300*d*, 300*e*, 300*f* are different from the navigation systems 300*a*, 300*b*, 300*c* in FIG. 1A, in that they are capable of establishing groups of members and communicating wirelessly with other navigation systems without the use of a vehicle network server. That is, the navigation systems 300*d*, 300*e*, 300*f* are capable peer-to-peer wireless communication 140, 146, 150 among selected members within the group without the use of a vehicle network server. The details of the operations of the vehicle navigation systems 300*d*, 300*e*, 300*f* will be explained below with reference to FIG. 3B. The wireless communication is preferably cellular communication, although any other type of wireless communication may be used. The navigation systems 300*d*, 300*e*, 300*f* are also capable of displaying the corresponding vehicle's location using conventional Global Position Systems (GPS) (not shown) installed therein.

Referring to FIG. 1B, the group interaction system 100*b* enables communication and interaction with members of a group according to the methods described in FIGS. 5, 6A, 6B, 7A, and 7B by using the navigation systems 300*d*, 300*e*, 300*f*. The vehicle navigation systems 300*d*, 300*e*, 300*f* in the vehicles 106*b*, 108*b*, 110*b*, respectively, are capable of wireless communication or interaction with one another. In the group interaction system 100*b* of FIG. 1B, wireless communication or interaction among selected members of the enabled group (selected users of the vehicle navigation systems 300*d*, 300*e*, 300*f*) is accomplished without the use of a vehicle network server. For example, the navigation system 300*d* in vehicle 106*b* may establish wireless communication or other types of interaction with the navigation system 300*e* in vehicle 108*b* directly via short-range radio communication 140 or indirectly via the communications service provider 104*b*, without the use of a vehicle network server. The wireless communication 140, 146, 150 between the navigation systems 300*d*, 300*e*, 300*f* themselves is preferably short range radio communication or IEEE 802.11b communication, but it should be clear to one skilled in the art that other types of wireless communication such as cellular communication or satellite communication may be used in accordance with the present invention.

The navigation systems 300d, 300e, 300f may also transmit or receive GPS information of the corresponding vehicles 106b, 108b, 110b, respectively, to other navigations systems 300d, 300e, 300f within the group using wireless communication directly 140, 146, 150 or indirectly via the communications service provider 104b, but without the use of a vehicle network server. For example, navigation system 300d may receive the GPS information of vehicles 108b, 110b, from the vehicle navigation systems 300e, 300f, respectively. The GPS information is transmitted directly by using short-range radio communication 140, 146, 150. The GPS information of the other vehicles 108b, 110b may be displayed on a display of the vehicle navigation system 300d along with the GPS information of its own vehicle 106b. Other control signals such as selection of group members and applications are also transmitted directly 140, 146, 150 by using short range radio communication.

On the other hand, data required for interaction among selected members of the group such as voice data in cellular telephone calls among the vehicle navigation systems 300d, 300e, 300f is transmitted and received among the vehicle navigation systems 300d, 300e, 300f via separate communication channels 142, 144, 148 though the communications service provider 104b. The communication channels 142, 144, 148 are preferably cellular communication channels.

An optional service operator 103b may also be coupled to the communication service provider 104b via wired communication 152 and provide various services to the members in the group, such as live operator service, voice mail service, and the like.

The group interaction system 100b establishes the enabled group for wireless communication or other types of interaction using various methods such as those described in FIGS. 6A and 6B. For example, the group may be established in the navigation systems 300d, 300e, 300f by manual input by its users. It should be clear to one skilled in the art that various methods of establishing an interactive group for the navigation systems may be used consistent with the present invention.

The group information for the group interaction system 100b contains various information regarding a plurality of members in the group, such as the identification of each vehicle navigation system 300d, 300e, 300f by their user names or any other type of identification, the vehicle identification numbers of the corresponding vehicles 106b, 108b, 110b, and cellular telephone numbers corresponding to the navigation systems 300d, 300e, 300f. The group information may also contain other information, such as information regarding the applications available on the respective navigation systems 300d, 300e, 300f for interaction with other members of the group.

Similar to the group interaction system 100a in FIG. 1A, the group interaction system 100b according to the second embodiment of the present invention may be used to establish a group of members for interaction, track the location of the members, and to communicate or interact with selected members of the group by wireless communication. However, the group interaction system 100b of FIG. 1B is different from the group interaction system 100a of FIG. 1A, in that it is capable of peer-to-peer communication among the members without the use of a vehicle network server 102. Here, the vehicle navigation system 300d, 300e, 300f initiating the group interaction process will establish the group and share the group information with other members of the group by transmitting such group information to the other vehicle navigation systems 300d, 300e, 300f via direct wireless communication 140, 146, 150. The manner in which members in the group are selected using the navigation systems and wireless communication or interaction among the selected members is accomplished will be described in detail below with reference to FIGS. 2–5, 6A–6B, and 7A–7B.

Figure 2:
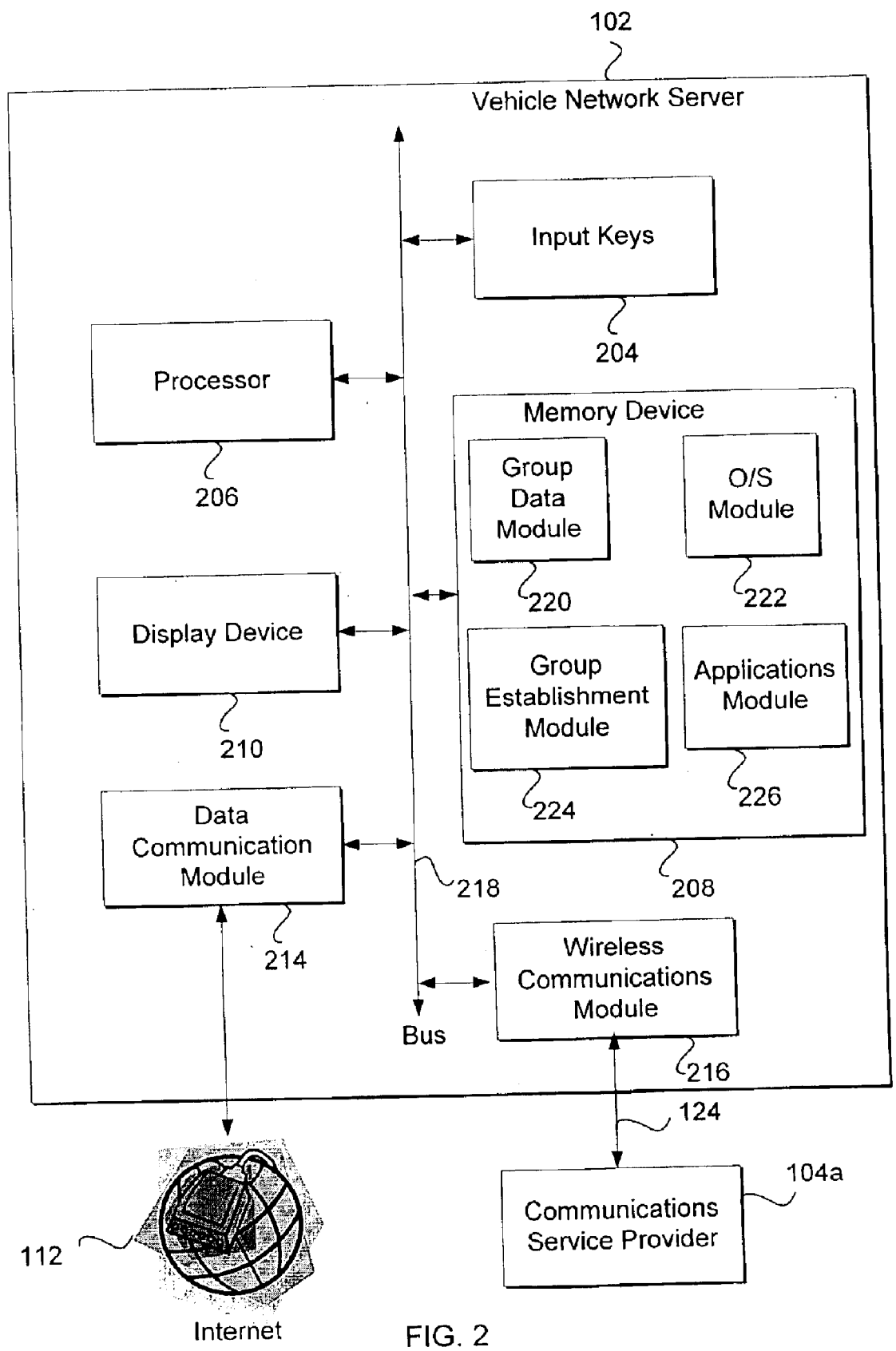
FIG. 2 is a block diagram illustrating a vehicle network server according to one embodiment of the present invention.

FIG. 2 is a block diagram illustrating a vehicle network server 102 according to one embodiment of the present invention. The vehicle network server 102 is used with the group interaction system 100a shown in FIG. 1A in order to provide interaction among members of a group of vehicle navigation systems 300a, 300b, 300c.

Referring to FIG. 2, the vehicle network server 102 includes an input device 204, a processor 206, a memory device 208, a display device 210, a data communication module 214, and a wireless communications module 216. The wireless communications module 216 is preferably a cellular telephone interface, although other types of wireless communication such as satellite communication, short-range radio communication, or communication according to the IEEE 802.11b standard, may be used. The wireless communications module 216 is capable of communicating with the various navigation systems 300a, 300b, 300c of FIG. 1 via the communications service provider 104a. The wireless communication 124 between the vehicle network server 102 and the communications service provider 104a is preferably cellular telephone communication. The wireless communications module 216 receives various control information from the navigation systems 300a, 300b, 300c, such as information regarding selection of a group, selection of members in the group, various information regarding the members of the group (e.g., identification of the members, cellular telephone numbers, etc.), selection of an application to launch among selected members, GPS information of the member vehicle navigation systems, etc. via the communication service provider 104a. Such control information is transmitted via text messaging of the cellular communication 124 between the communications service provider 104a and the vehicle network server 102. Such control information received by the wireless communications module 216 is stored in the memory device 208 for use by the vehicle network server 102 according to the present invention. The wireless communications module 216 also transmits and receives interactive application data, such as actual voice data and associated control signals for cellular telephone calls, to and from the vehicle navigation systems 300a, 300b, 300c via the communications service provider 104a using cellular communication 124.

The data communication module 214 is a conventional interface that enables connection to a data communication networks such as the Internet. The data communication module 214 may be a standard Ethernet interface or the like. The data communication module 214 receives various information from the Internet 112. For example, users of the navigation systems 300a, 300b, 300c may establish a group for, interaction on a web server using a web page on the Internet 112, with all the information (e.g., identification of members, cellular telephone numbers of members, etc.) used for establishing the group and communicating or interacting with members in the group. Such group information may also be used as the default group information in case no group information is input to the vehicle navigation systems 300a, 300b, 300c. The vehicle network server 102 may also operate as the web server on the Internet 112. The group information stored on the web server on the Internet 112 may be downloaded to the vehicle network server 102 via the data communication module 214 and eventually transmitted to the navigation systems 300*a*, 300*b*, 300*c* via the wireless communications module 216 and the communications service provider 104*a*. Each vehicle navigation system 300*a*, 300*b*, 300*c* stores the group information in the memory device 208.

The processor 206 controls the operation of the various components in the vehicle network server 102, including the input device 204, the memory device 208, the display device 210, the data communications module 214, the wireless communications module 216, via the bus 218. To this end, the processor 206 executes instructions or programs stored in the memory device 208 to provide various functionalities of the vehicle network server 102, such as establishing a group, establishing communication among selected members of the group, running an application associated with selected members of the group, and the like.

The memory device 208 operates as a working memory for the processor 206 and also stores various information used by the vehicle network server 102 and/or the vehicle navigation systems 300*a*, 300*b*, 300*c*. The memory device 208 includes a group data module 220, an O/S (operating system) module 222, a group establishment module 224, and an applications module 226. The O/S module 222 stores the operating systems or boot-up sequences for the vehicle network server 102. The group data module 220 stores all the group information such as group member list, identification of the group members, and the like. The group establishment module 224 stores instructions and programs for establishing a group of members according to the methods described in FIGS. 6A and 6B. The applications module 226 stores various applications for interaction with selected members of the group, such as a cellular telephone application, game application, and the like. The memory device 208 is preferably a rewritable memory such as an SRAM, flash memory, or hard disk.

In a more distributed system according to another embodiment of the present invention, the memory device 208 may store less information, such that the group information, the applications, and/or the information for establishing a group are stored in the vehicle navigation systems 300*a*, 300*b*, 300*c* themselves rather than the in the vehicle network server 102.

The display device 210 displays information used for interaction with live operators when the live operators are directly using the vehicle network server 102 to service the vehicle navigation systems 300*a*, 300*b*, 300*c*. In such case, the input device 204 is used by the live operators to input data and commands to the vehicle network server 102. The input device 204 may be any type, such as a keyboard, a touch screen input, or the like. For example, live operators may manually input group information in response to a request received from a user of a vehicle navigation system 300*a*, 300*b*, 300*c* via the wireless communications module 216. As discussed above, the live operators may also be based in a service operator 103 communicatively coupled to the vehicle network server 102, in which case the display device 210 and the input device 204 is optional components of the vehicle network server 102.

The vehicle network server 102 operates in conjunction with the vehicle navigation systems 300*a*, 300*b*, 300*c* to provide the group interaction functions of the present invention. For example, the vehicle network server 102 may store group information (member list, member identification, members' cellular telephone numbers, etc.) in group data module 220 of the memory device 208 for use by the vehicle navigation systems 300*a*, 300*b*, 300*c*. The processor 206 in the vehicle network server 102 may also download such group information to the vehicle navigation systems 300*a*, 300*b*, 300*c* via the wireless communications module 216. The vehicle network server 102 may receive a request to establish communication or run a selected application (e.g., a cellular telephone call or an interactive game) with respect to selected members in the group from the vehicle navigation systems 300*a*, 300*b*, 300*c* via the wireless communications module 216. In response, the processor 206 in the vehicle network server 102 may run the selected application stored in the application module 226 of the memory device 208 with respect to the selected members via the wireless communications module 216 and the communications service provider 104 or establish wireless communications by placing a group call to the selected members.

Figure 3A:
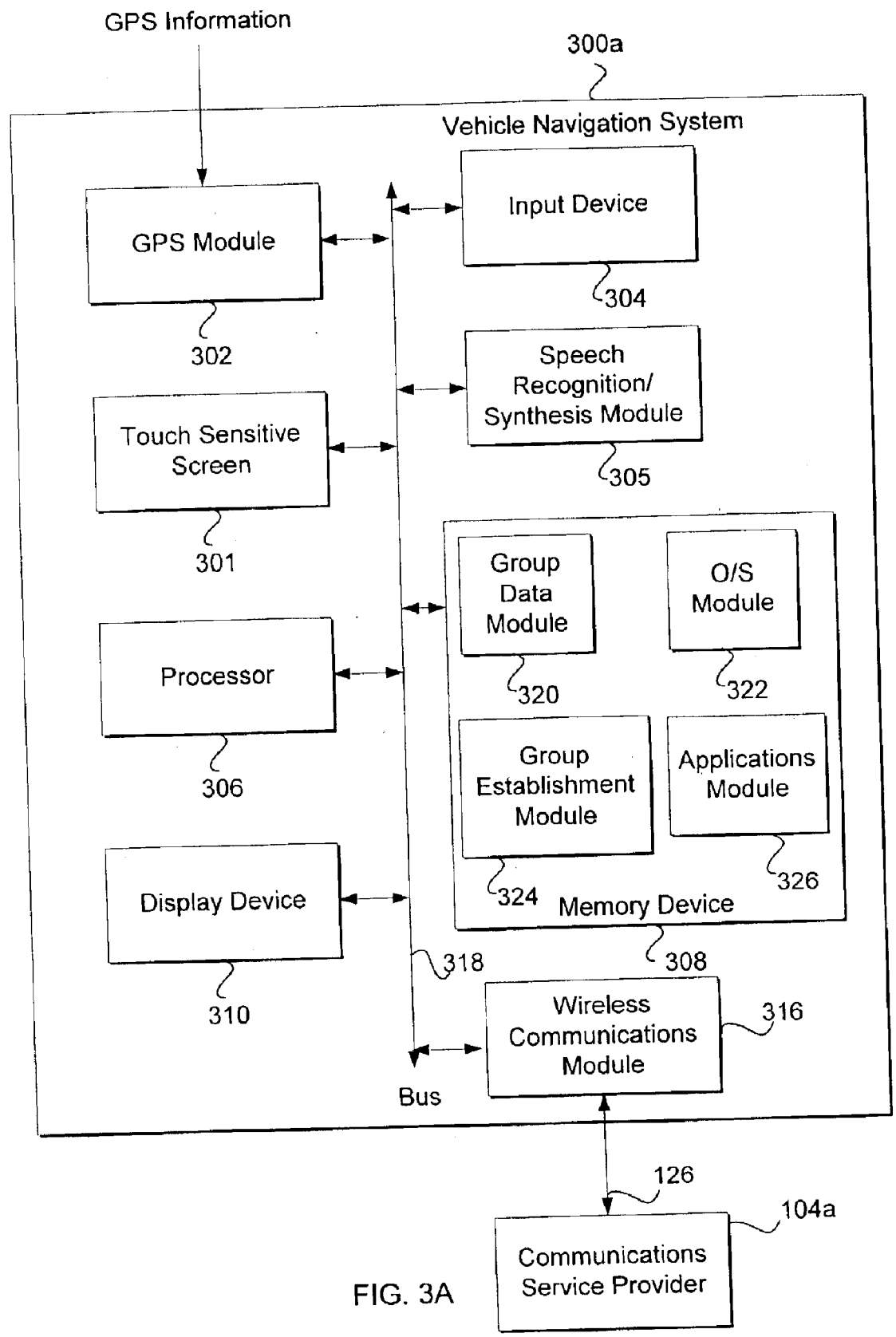
FIG. 3A is a block diagram illustrating a vehicle navigation system according to a first embodiment of the present invention.

FIG. 3A is a block diagram illustrating a vehicle navigation system 300*a* according to a first embodiment of the present invention. The vehicle navigation system 300*a* in FIG. 3A is used with the group interaction system 100*a* in FIG. 1A. Referring to FIG. 3A, the vehicle navigation system 300*a* includes a touch sensitive screen 301, a GPS module 302, an input device 304, a speech recognition/synthesis module 305, a processor 306, a memory device 308, a display device 310, a wireless communications module 316, and a bus 318. The vehicle navigation system 300*a* of the present invention is capable of performing the group establishment and interaction functions according to the present invention in addition to the functions of conventional vehicle navigation systems such as displaying the location of the vehicle in which the vehicle navigation system 300*a* resides on a displayed map.

The wireless communications module 316 is preferably a cellular telephone interface (such as a GSM telephone interface). The wireless communications module 216 is capable of communicating with the various navigation systems 300 and the vehicle network server 102 using cellular communication via the communications service provider 104*a*. The wireless communications module 316 communicates various information to/from the vehicle network server 102 via the communications service provider 104, such as control data regarding selection of a group, selection of members in the group, various information regarding the members (e.g., identification of the members, cellular telephone numbers, etc.), selection of an application to run among the selected members, GPS information of the vehicle or other vehicles of the group, etc. These control data are transmitted by text messaging of the cellular communication. On the other hand, application data (such as voice data for cellular telephone calls) is transmitted and received using typical cellular communication.

The processor 306 controls the operation of the various components in the vehicle navigation system 300, including the input device 304, the speech recognition/synthesis module 305, the memory device 308, the display device 310, the wireless communications module 316, the GPS module 302, and the touch sensitive screen 301. To this end, the processor 306 executes instructions or programs stored in the memory device 308 to provide various functionalities of the vehicle navigation system 300, such as establishing a group, requesting communication among selected members of the group to the vehicle network server 102, running an application associated with selected members of the group, and the like.

The memory device 308 operates as a working memory for the processor 306 and also stores various information used by the vehicle navigation system 300a. The memory device 308 includes a group data module 320, an O/S (operating system) module 322, a group establishment module 324, and an applications module 326. The O/S module 322 stores the operating systems or boot-up sequences for the vehicle network server 102. The group data module 320 stores all the group information such as group member list, identification of the group members, and the like. The group establishment module 324 stores instructions and programs for establishing a group of members according to the methods described in FIGS. 6A and 6B. The applications module 326 stores various applications for interaction with selected members of the group, such as a cellular telephone application, game application, and the like. The applications module 326 also stores a GPS application and associated map information for determining and displaying the location of the vehicle navigation systems 300a. The memory device 308 is preferably a rewritable memory such as an SRAM, flash memory, or hard disk.

In a less distributed system according to another embodiment of the present invention, the memory device 208 may store less information such that the group information, the applications, and/or the application information for establishing wireless communication is stored in the vehicle network server 102 rather than in the vehicle navigation system 300a.

Figure 4:
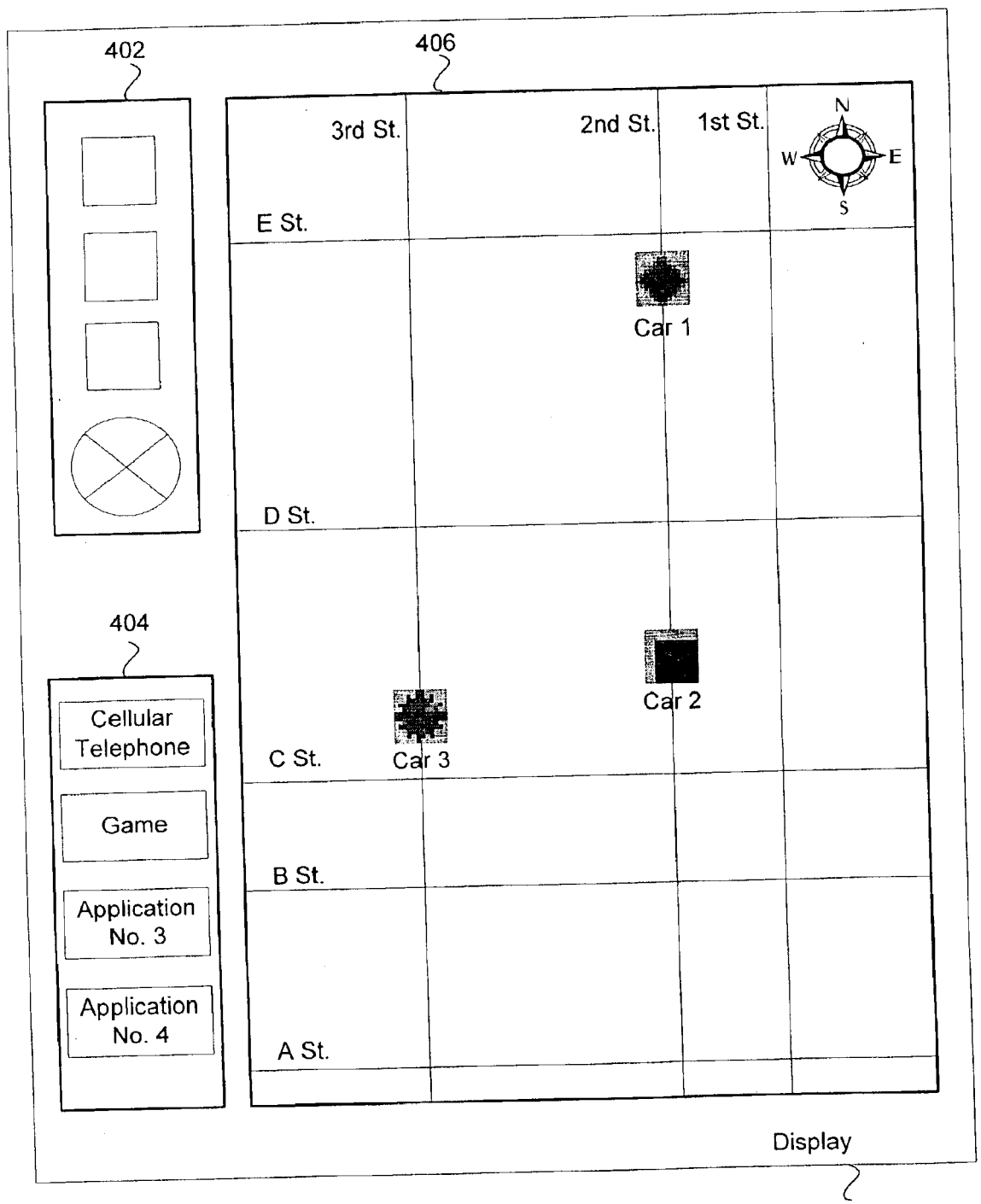
FIG. 4 is a graphical representation of the screen of the display device on a vehicle navigation system according to one embodiment of the present invention.

The display device 310 displays information used for interaction with the user of the vehicle navigation system 300a. For example, the display device 310 displays an interactive map as shown in FIG. 4 in order to indicate the location of the group members and facilitate selection of members and launching of associated applications with respect to the selected members. The display device 310 is preferably a liquid crystal display (LCD) although other types of display devices may be used.

The touch sensitive screen 301 is overlapped with the display device 310 in order to provide the user with capabilities of entering commands and data on an interactive display. The touch sensitive screen 301 is preferably a conventional resistive touch sensitive screen although other types of touch sensitive screens may be provided. The display device 310 and the touch sensitive screen 301 will be explained in more detail with reference to FIG. 4.

Alternative input and output means are also present in the vehicle navigation system 300a. For example, the user may enter various data and commands to the vehicle navigation system 300a using the input device 304 such as physical keys. The user may also enter data and commands for interaction with group members using the speech recognition/synthesis module 305. Alternatively, the information shown on the display device 310 may be converted to a form of speech by the speech recognition/synthesis module 305 to convey the information therein to the user in audio form. The speech recognition/synthesis module 305 is a conventional speech recognition and synthesis module including a microphone (not shown), a speaker (not shown) and the software capabilities to recognize and synthesize speech. The operations of the conventional speech recognition/synthesis module 305 is well known to one skilled in the art and a detailed description of such operations is not necessary for an understanding of the present invention.

The GPS module 302 receives GPS information from GPS satellites via a GPS sensor (not shown) and determines the current location of the vehicle in which the vehicle navigation system 300a resides by way of conventional triangulation schemes. The determined location is shown on the display device 310 along with the locations of other vehicles of the group received from the other vehicle navigation systems 300 via the wireless communications module 316. As stated above, information regarding the locations of other vehicles is transmitted by text messaging in cellular communication (such as GSM).

The vehicle navigation system 300a operates in conjunction with the vehicle network server 102 and other vehicle navigation systems 300b, 300c in other vehicles 108a, 110a of the group to provide the group interaction functions of the present invention, as explained in FIGS. 5, 6, and 7A–7C. For example, the vehicle navigation system 300 may store group information (member list, member identification, members' cellular telephone number, etc.) in the memory device 308. The vehicle navigation system 300 may also transmit a request to make a cellular telephone call or launch a selected application (such as an interactive game) with respect to selected members in the group to the vehicle network server 102 via the wireless communications module 216. The vehicle navigation system 300 may also store and run such applications in the memory 308 of the vehicle navigation system 300 itself.

Figure 3B:
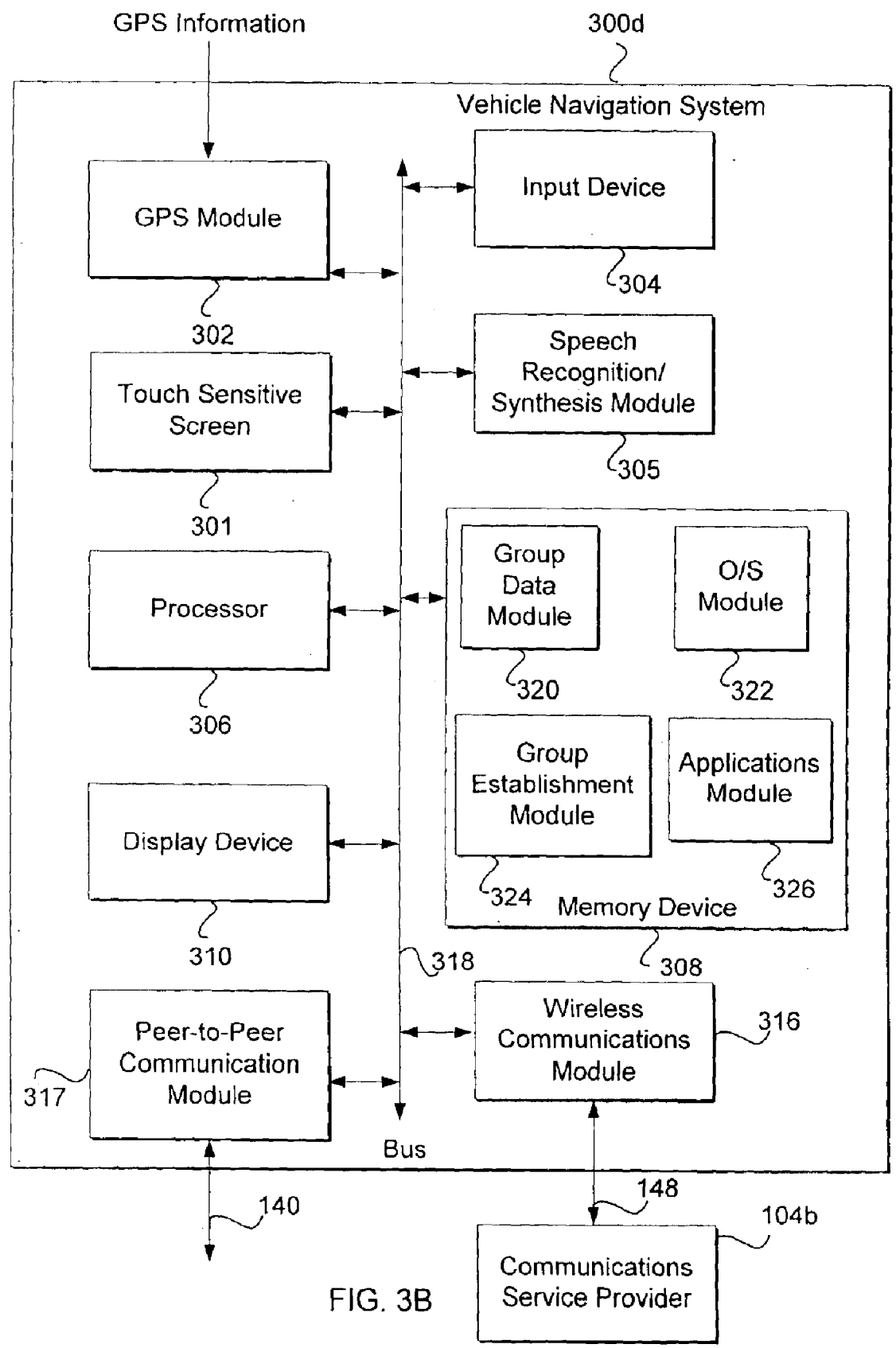
FIG. 3B is a block diagram illustrating a vehicle navigation system according to a second embodiment of the present invention.

FIG. 3B is a block diagram illustrating a vehicle navigation system 300d according to a second embodiment of the present invention. The vehicle navigation system 300d in FIG. 3B is used with the group interaction system 100b in FIG. 1B. The vehicle navigation system 300d is same as the vehicle navigation system 300a described in FIG. 3A except that it includes a peer-to-peer communication module 317 for communicating directly with other vehicle navigation systems 300d. Control data such as selection of a group, various information regarding the members (e.g., identification of the members, cellular telephone numbers, etc.), and GPS information of the vehicle or other vehicles of the group, etc are transmitted via the peer-to-peer communication module 317. The peer-to-peer communication module 317 is preferably a short-range radio communication interface, although other types of communication interfaces, such as IEEE 802.11b standard communication interfaces, may be used. On the other hand, selection of an application to run among the selected members, selection of members in the group for interaction, and actual application data (such as voice data for cellular telephone calls) is transmitted and received via the wireless communication module 316 by using typical cellular communication. In addition, the data and programs in the O/S module 322 and the group establishment module 324 and the operations of the processor 306 are modified from those in the vehicle navigation system 300a to accommodate the functionalities of the peer-to-peer communication module 317.

FIG. 4 is a graphical representation of the screen of the display device of the vehicle navigation system 300a or 300d according to one embodiment of the present invention. Map 406 is shown on a display device 310 overlapped with a touch sensitive screen 301. Referring to FIG. 4, the map 406 is displayed indicating the location and names of various streets. The locations of three cars (car 1, car 2, and car 3) of a given group are also displayed on the map 306, although it should be clear to one skilled in the art that any number of cars may be shown on the map 406 depending upon the number of members in the group. Assuming that the display device 310 is one in the vehicle navigation system 300a or 300d of car 1, the location of car 1 is determined by the GPS module 302 and displayed on the map 406. The locations of other vehicles (car 2 and car 3) of the group are received via the wireless communications module 316 from the vehicle navigation systems 300b, 300c in cars 2 and 3 or via the peer-to-peer communications module 317 from the vehicle navigation systems 300e, 300f in cars 2 and 3 and are likewise displayed on the map 406. The user of the vehicle navigation system 300a, 300d may select a certain car by touching the icon (indication) corresponding to the car in order to launch or run an application with respect to such selected car. For example, the user may touch the indication of car 2 on the map 406 to select car 2 and launch an application (such as making a cellular telephone call) with respect to car 2. The display device 310 is overlapped with a touch sensitive screen 301, so the touch sensitive screen 301 may determine which car is selected by detecting the location of the user's touch.

The list of applications 404 shows various applications, such as the cellular telephone application, an interactive game application, and two other applications available to the vehicle navigation system 300 with respect to the selected members in the group. The user may select a desired application by touching the part of the screen that indicates the desired application in the list of applications 404.

The input icons 402 on the touch sensitive screen 301 are used to enter various data and commands to the vehicle navigation system 300. The input icons 402 preferably include various icons corresponding to commands and data for navigating through a menu and selecting a particular item on the menu, so that a user may input various data and commands for establishing an interactive group or launching an application with respect to selected members.

In actual use, the user of the vehicle navigation system 300 selects one or more cars in the group with which the user wishes to interact by touching the icons corresponding to the desired cars on the map 406, and selects an application to be launched with respect to the members in the group by touching the icon corresponding to the desired application in the list of applications 404. For example, when the user in car 1 wishes to place a cellular telephone call with car 2, the user selects car 2 by touching the indication of car 2 on the map 406, and selects the cellular telephone application by touching the corresponding icon of the cellular telephone application among the list of applications 404. In response, the vehicle navigation system 300 launches the selected application (cellular telephone application) with respect to car 2 according to the method described below with reference to FIGS. 7A and 7B.

The graphical representation of the display device 310 illustrated in FIG. 4 is a mere example of a user interface for the vehicle navigation system 300a, 300d. It should be obvious to one skilled in the art that any type or form of user interface may be used in the vehicle navigation systems 300a, 300d to interact with the users.

Figure 5:
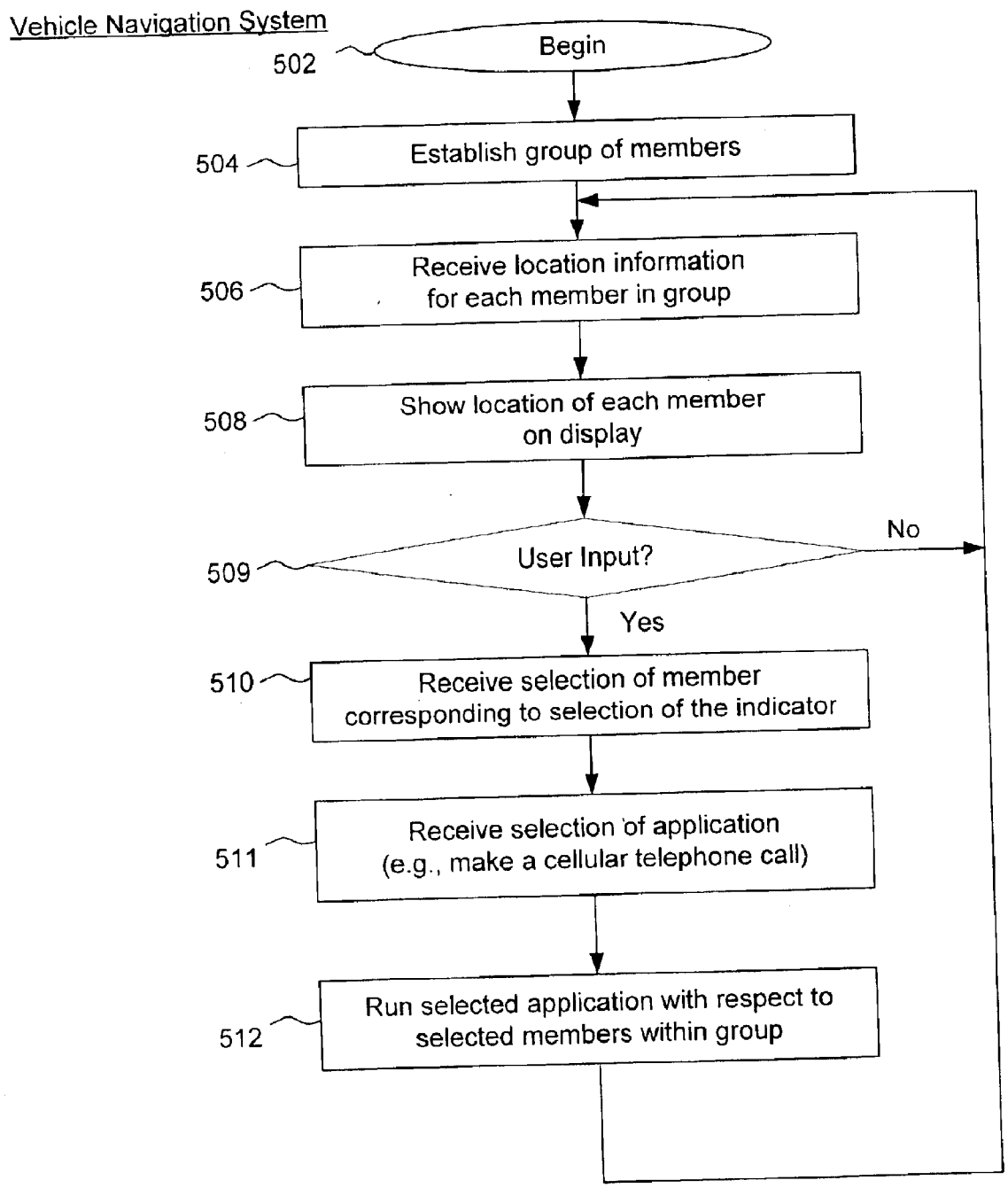
FIG. 5 is a flowchart illustrating a method of interacting with members within an enabled group using the vehicle navigation system according to one embodiment of the present invention.

FIG. 5 is a flowchart illustrating a method of interacting with selected members within an enabled group using the vehicle navigation system 300a, 300d according to one embodiment of the present invention. As the process begins 502, the user of the vehicle navigation system 300 establishes 504 a group of members (cars or vehicle navigation systems) with which the user wishes to interact. The information used in establishing the group of members may include the member's identification (e.g., a cellular telephone number corresponding to the member or vehicle identification number corresponding to the vehicle) and the applications available to each group member. Step 504 is illustrated in more detail below with reference to FIGS. 6A and 6B.

Once the group is established, the vehicle navigation system 300 receives 506 information regarding the location of each member in the group from each vehicle navigation system 300 corresponding to the members via the wireless communications module 316. Such locations are displayed 508 on the display device 310 as icons on the map 406 and repetitively updated until a user input is received 509.

The user selects one or more of the members by touching the icons corresponding to the desired members on the map 406, and the vehicle navigation system 300a, 300d receives 510 such selection of the members. Then, the vehicle navigation system 300a, 300d receives 511 a selection of an application from the user. For example, the vehicle navigation system 300 may receive a selection to make a cellular telephone call to the selected members. In response, the vehicle navigation system 300 launches 512 the selected application with respect to the selected members within the group. For example, if the selected application is a cellular telephone call, the vehicle navigation system 300a, 300d makes a cellular telephone call or requests the vehicle network server 102 to make a cellular telephone call to the selected member(s). If selected application is an interactive game, the vehicle navigation system 300a, 300d launches the interactive game application or requests the vehicle network server 102 to launch the interactive game application among the selected member(s). Step 512 is illustrated in more detail with reference to FIGS. 7A and 7B. The process then returns to step 506 for further real-time tracking of the members' locations and receipt of selection of members and applications.

FIG. 6A is a flowchart illustrating the step 504a of establishing a group of members according to a first embodiment of the present invention. The step 504a of FIG. 6A establishes the group of members by cooperation of the vehicle navigation system 300a and the vehicle network server 102 and is used with the group interaction system 100a described in FIG. 1A.

Referring to FIG. 6A, as the process begins 502, the vehicle navigation system 300a receives 604 selection of the members to be included in the group. Such selection of members may be input by using the touch sensitive screen 301 or the input device 302. The vehicle navigation system 300a transmits 606 such selection of group members to the vehicle network server 102. The vehicle network server 102 establishes 608 communications with the selected group members and requests 610 each selected member for permission to add the member to the group. Then, the vehicle network server 102 transmits 612 the results of the requests 610 back to the vehicle navigation system 300a. Thereafter, the vehicle network server 300a adds 614 the members giving permission to the enabled group. This group information may be shared with other members of the group. To this end, the vehicle navigation system 300a transmits 616 the established group information to the vehicle navigation system 102, and the vehicle navigation system 102 in turn transmits 618 such established group information to the members of the group, and the process continues with step 506.

FIG. 6B is a flowchart illustrating step 504b of establishing a group of members according to a second embodiment of the present invention. The step 504b of FIG. 6B establishes the group of members in the vehicle network server 102 using information downloaded from an external source and downloads the group information to the vehicle navigation systems 300a.

Referring to FIG. 6B, as the process begins 502, the vehicle network server 102 receives 632 a list of members from an external source. For example, the vehicle network server 102 may downloaded the list of members of the group from an Internet web server via its data communication module 212. As another example, a live operator may manually input the list of members of the group by using the input keys 204. The vehicle network server 102 establishes 634 the group of members for interaction by using the received list of members. Then, the vehicle network server 102 downloads 636 the established group information to the vehicle navigation systems 300a, 300b, 300c in the group, and the process continues with step 506.

Although two embodiments of establishing a group has been described above with reference to FIGS. 6A and 6B, the group may also be established simply by manually inputting the group information in the vehicle navigation systems 300a, 300d using the touch sensitive screen 301 or the input devices 304. In addition, the group may also be simply selected in the vehicle navigation systems 300a, 300d from a predetermined set of group lists which are stored in the vehicle navigation systems 300a, 300d based upon previous use or setting by its users.

Figure 7A:
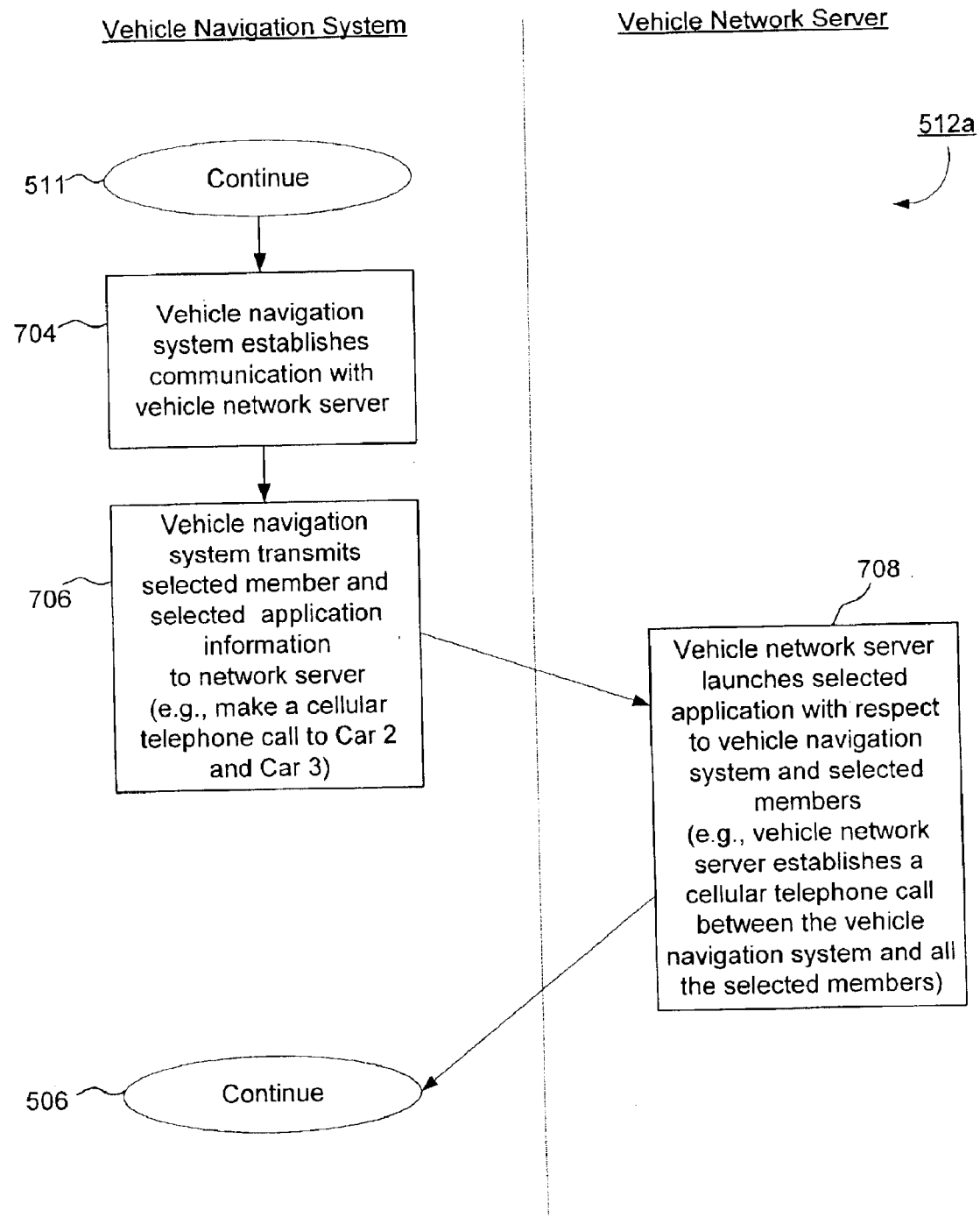
FIG. 7A is a flowchart illustrating a method of running the selected application with respect to the vehicle navigation system and the selected members according to one embodiment of the present invention.

FIG. 7A is a flowchart illustrating the step 512a of running the selected application with respect to the vehicle navigation system 102 and the selected members according to one embodiment of the present invention. Step 512a illustrated in FIG. 7A runs the selected application stored in a vehicle network server 102 by cooperation of the vehicle navigation system 300a and the vehicle network server 102.

Referring to FIG. 7A, as the process continues 511, the vehicle navigation system 300a establishes 704 communications with the vehicle network server 102 and transmits 706 the selected member and selected application information to the vehicle network server 102. For example, the vehicle navigation system 300 transmits to the vehicle network server 102 a request to make a cellular telephone conference call to Car 2 and Car 3 in the group. The vehicle network server launches 708 the selected application with respect to the vehicle navigation system 300a transmitting such information and to the selected members, and the process continues 810. For example, the vehicle network server 102 makes a cellular telephone call between the vehicle network server 300a transmitting such information and all the selected members by running a cellular telephone application stored in the applications module 226 of the memory device 208.

Figure 7B:
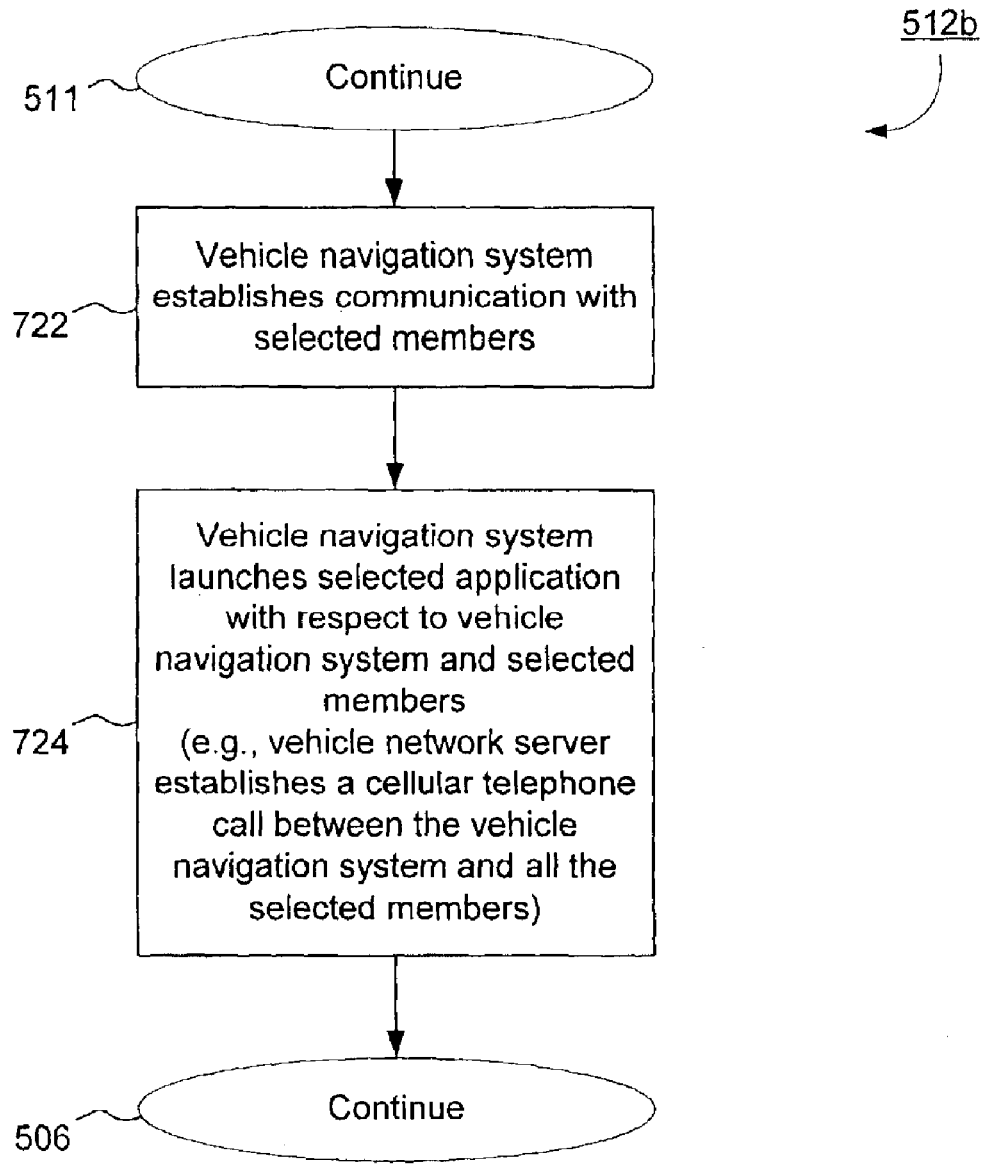
FIG. 7B is a flowchart illustrating a method of running the selected application with respect to the vehicle navigation system and the selected members according to another embodiment of the present invention.

FIG. 7B is a flowchart illustrating a step 512b of launching the selected application with respect to the vehicle navigation system and the selected members according to another embodiment of the present invention. Step 512b illustrated in FIG. 7B launches the selected application stored in the vehicle navigation system 300d and thus does not involve communication with the vehicle network server 102. As such, step 512b is used by the vehicle navigation system 300d when it is used in the group interaction system 100b capable of peer-to-peer communication. That is, step 512b may be used when the vehicle navigation system 300d communicates with other members directly via short-range radio communication or the like, without the use of the vehicle network server 102.

Referring to FIG. 7B, as the process continues 511, the vehicle navigation system 300d establishes 722 communications with the selected members directly via the wireless communications module 316 through the communications service provider 104. Then, the vehicle navigation system 300 launches 724 the selected application with respect to the vehicle navigation system 300d and the selected members by running the selected application stored therein, and the process continues with step 506. For example, the vehicle navigation system 300d may place a cellular telephone call to the selected members through the communications service provider 104.

Figure 7C:
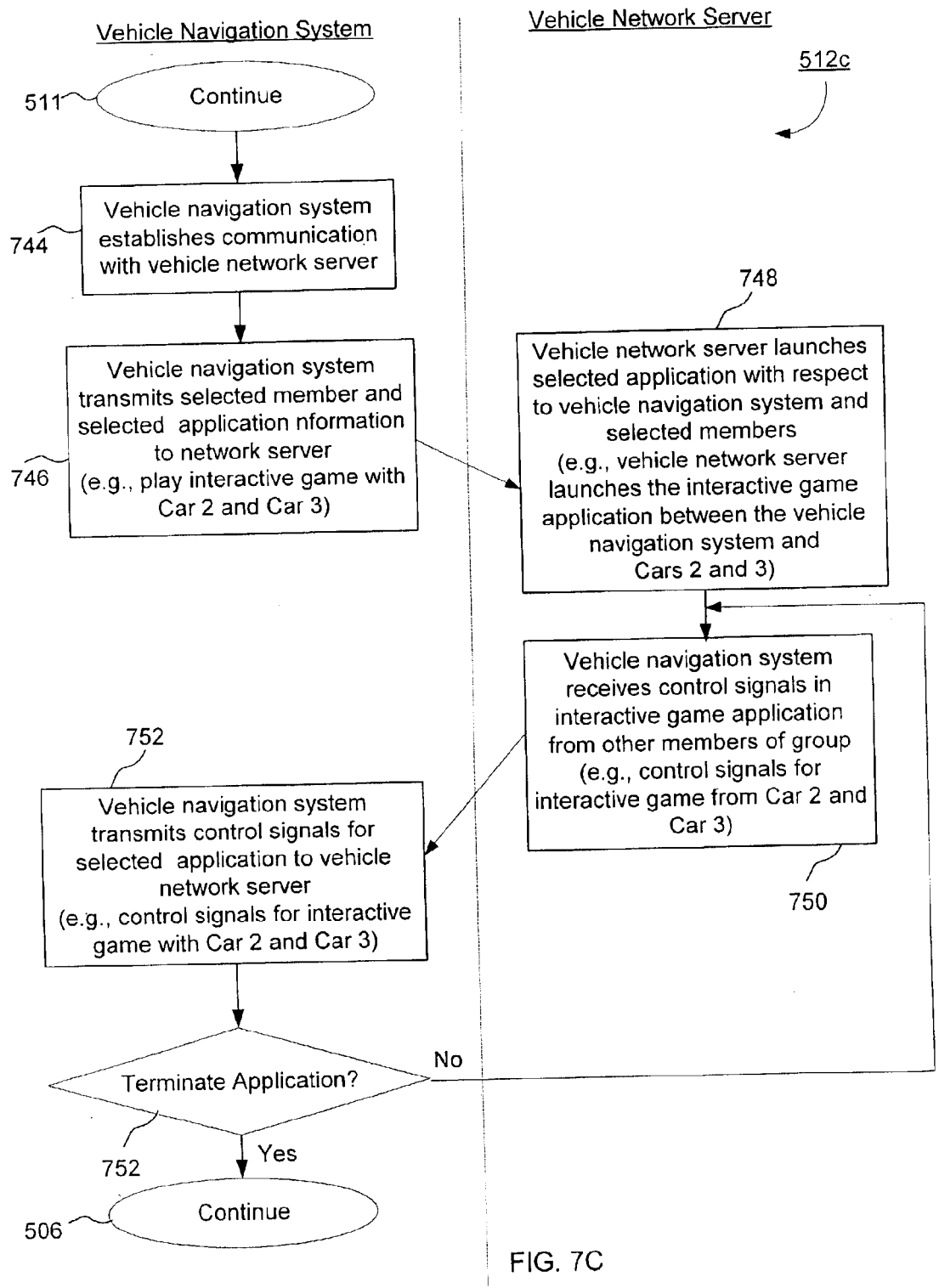
FIG. 7C is a flowchart illustrating a method of running the selected application with respect to the vehicle navigation system and the selected members according to still another embodiment of the present invention.

FIG. 7C is a flowchart illustrating the step 512c of running the selected application with respect to the vehicle navigation system and the selected members according to still another embodiment of the present invention. Step 512c illustrated in FIG. 7C runs a selected application stored in a vehicle network server 102 by cooperation of the vehicle navigation system 300a and the vehicle network server 102. The application run in FIG. 7C is one that requires constant interaction and communication of control signals among the selected members of the group, such as an interactive game.

Referring to FIG. 7C, as the process continues 511, the vehicle navigation system 300a establishes 744 communications with the vehicle network server 102 and transmits 746 the selected member and selected application information to the vehicle network server 102. For example, the vehicle navigation system 300 transmits to the vehicle network server 102 a request to run an interactive game with respect to Car 2 and Car 3 in the group. The vehicle network server launches 748 the selected application with respect to the vehicle navigation system 300a transmitting such information and to the selected members. For example, the vehicle network server 102 launches the interactive game application with respect to the vehicle network server 300a transmitting such information and all the selected members (cars 2 and 3). The interactive game application is stored in the applications module 226 of the memory device 208. Thereafter, the vehicle network server receives 750 other controls used in the launched application (e.g., control signals for interactive game application) from the selected members (cars 2 and 3). The vehicle navigation system 300a also transmits 752 control signals used in the interactive application to the vehicle navigation system 102 so that the vehicle navigation system can run the interactive application based upon the control signals from the vehicle navigation systems 300a and other selected members. Steps 750 and 752 are repeated until a command to terminate the application is received 752 by the vehicle navigation system 300a. Then, the process continues with step 506.

Although the present invention has been described above with respect to several embodiments, various modifications can be made within the scope of the present invention. The type of communication used among the vehicle navigation systems or between the vehicle navigation system and the vehicle network server is not limited to those described above, and any type of wireless communication may be used according to the present invention. The information required for establishing a group of members may vary depending upon the type of applications to run among the selected members and is not limited to the type of information described above. It should be obvious that the present inventions may be used with any numbers of a group. The type of applications that is run among the selected members is not limited to cellular telephone obvious to one skilled in the art that any type of application may be used with respect to selected members of the group. Accordingly, the disclosure of the present invention is intended to be illustrative, but not limiting, of the scope of the invention, which is set forth in the following claims.

What is claimed is:

1. A vehicle navigation system capable of interacting with a plurality of other vehicle navigation systems of a group, the vehicle navigation system comprising:
 a memory device including a group data module, a group establishment module, and an applications module, the group data module storing identification information identifying members of the group of the vehicle navigation system and said other vehicle navigation systems, the group establishment module storing a group establishment application configured to be executed in the vehicle navigation system for establishing the group, and the applications module storing a plurality of group interaction applications for interaction with selected ones of the members of the group, a selected one of said group interaction applications being executed among said selected ones of the members of the group; and a processor coupled to the memory device for executing the group establishment application and said selected one of the group interaction applications.

2. The vehicle navigation system of claim 1, wherein the applications module further stores a global position system application for determining locations of the members of the group.

3. A vehicle navigation system in a first vehicle and capable of interacting with a plurality of other vehicle navigation systems of a group, the group comprised of the vehicle navigation system in the first vehicle and the other vehicle navigation systems in a plurality of second vehicles, the vehicle navigation system comprising:

a global positioning system (GPS) module receiving a GPS signal and determining a location of the first vehicle based upon the GPS signal;

a wireless communications module for communicating with the other vehicle navigation systems of the group and receiving location information corresponding to the second vehicles from the other vehicle navigation systems of the group;

a display device coupled to the GPS module and the wireless communications module and displaying the location of the first vehicle and the second vehicles on a map and a list of a plurality of group interaction applications;

a touch sensitive screen coupled to the display device and capable of receiving input commands corresponding to a selection of one or more of the second vehicles on the map and a selection of one of the group interaction applications;

a processor coupled to the touch sensitive screen for executing the selected one of the group interaction applications with respect to the vehicle navigation system in the first vehicle and the other vehicle navigation systems in the selected ones of the second vehicles and a group establishment application for establishing the group; and a memory device storing the group interaction applications, the group establishment application, and identification information identifying the other vehicle navigations systems in the second vehicles of the group.

4. The vehicle navigation system of claim 3, wherein the identification information is a cellular telephone number corresponding to each of the other vehicle navigation systems in the second vehicles or a vehicle identification number corresponding to each of the second vehicles.

5. The vehicle navigation system of claim 3, wherein the vehicle navigation system in the first vehicle is communicatively coupled to the other vehicle navigation systems in the second vehicles via the wireless communication module without a vehicle network server.

6. The vehicle navigation system of claim 3, wherein the vehicle navigation system receives the identification information corresponding to the other vehicle navigation systems in the second vehicles by receiving input to the vehicle navigation system on the touch sensitive screen.

7. The vehicle navigation system of claim 3, wherein the wireless communications module is a cellular telephone interface.

8. The vehicle navigation system of claim 3, wherein the selected one of the group interaction applications is a cellular telephone application and the processor enables establishment of a cellular telephone call between the vehicle navigation system in the first vehicle and the other vehicle navigation systems in the selected second vehicles.

9. The vehicle navigation system of claim 3, wherein the locations of the first vehicle and the second vehicles are indicated on the display device as icons on the map and one or more of the second vehicles are selected for interaction by touching the corresponding icons as the input commands to the touch sensitive screen.

10. In a first vehicle navigation system, a method of interacting with a plurality of second vehicle navigation systems, the method comprising:

establishing a group including the first vehicle navigation system and the second vehicle navigation systems by executing a group establishment application in the first vehicle navigation system;

receiving information regarding the locations of the first vehicle navigation system and the second vehicle navigation systems;

displaying the locations of the first and the second vehicle navigation systems;

displaying a plurality of group interaction applications;

receiving selection of one or more of the second vehicle navigation systems;

receiving selection of one of the group interaction applications; and executing said selected one of the group interaction applications with respect to the first vehicle navigation system and said selected ones of the second vehicle navigation systems.

11. The method of claim 10, wherein establishing a group comprises;

receiving identification information corresponding to the first vehicle navigation system and the plurality of second vehicle navigation systems;

establishing communication with the plurality of second vehicle navigation systems based upon the identification information and requesting the plurality of second vehicle navigation systems for permission to be added to the group; and adding to the group the second vehicle navigation systems giving permission.

12. The method of claim 11, wherein the identification information is a cellular telephone number corresponding to each of the first and second vehicle navigation systems.

13. The method of claim 10, wherein establishing a group comprises executing the group establishment application in the first vehicle navigation system to receive identification information corresponding to the first vehicle navigation system and the second vehicle navigation systems from a vehicle network server communicatively coupled to the first vehicle navigation system.

14. The method of claim 10, wherein said selected one of the group interaction applications is a cellular telephone application and executing said selected one of the group interaction applications comprises establishing a cellular telephone call between the first vehicle navigation system and said selected ones of the second vehicle navigation systems.

15. A vehicle navigation system in a first vehicle and capable of interacting with a plurality of other vehicle navigation systems of a group, the group comprised of the vehicle navigation system in the first vehicle and the other vehicle navigation systems in second vehicles, the vehicle navigation system comprising:

global positioning system (GPS) means for receiving a GPS signal and determining a location of the first vehicle based upon the GPS signal;

communication means for communicating with the other vehicle navigation systems of the group and receiving location information corresponding to the second vehicles from the other vehicle navigation systems of the group;

output means coupled to the GPS means and the communications means for outputting the location of the first vehicle and the second vehicles on a map and a list of a plurality of group interaction applications;

input means coupled to the output means for receiving input commands corresponding to a selection of one or more of the second vehicles on the map and a selection of one of the group interaction applications;

processor means coupled to the input means for executing the selected one of the group interaction applications with respect to the vehicle navigation system in the first vehicle and the other vehicle navigation systems in the selected ones of the second vehicles and a group establishment application for establishing the group; and memory means for storing the group interaction applications, the group establishment application, and identification information identifying the other vehicle navigations systems in the second vehicles of the group.

* * * * *

UNITED STATES PATENT AND TRADEMARK OFFICE
CERTIFICATE OF CORRECTION

PATENT NO. : 6,868,333 B2
DATED : March 15, 2005
INVENTOR(S) : Roger D. Melen

It is certified that error appears in the above-identified patent and that said Letters Patent is hereby corrected as shown below:

<u>Title page,</u>
Item [57], ABSTRACT,
Line 9, please replace "to interact" with -- are selected for interaction --
Line 14, please insert the word -- vehicle -- between "other" and "navigation".

Signed and Sealed this

Fourteenth Day of June, 2005

JON W. DUDAS
*Director of the United States Patent and Trademark Office*